United States Patent
Funk et al.

(10) Patent No.: US 9,434,057 B2
(45) Date of Patent: Sep. 6, 2016

(54) ELECTRIC SCREWDRIVER

(75) Inventors: Alexander Funk, Schwabegg (DE);
Louis Widmer, Ulisbach (CH)

(73) Assignee: Hilti Aktiengesellschaft, Schaan (LI)

( * ) Notice: Subject to any disclaimer, the term of this patent is extended or adjusted under 35 U.S.C. 154(b) by 494 days.

(21) Appl. No.: 13/481,432

(22) Filed: May 25, 2012

(65) Prior Publication Data

US 2013/0134684 A1    May 30, 2013

(30) Foreign Application Priority Data

May 25, 2011    (DE) .................... 10 2011 076 454

(51) Int. Cl.
*B25B 23/00* (2006.01)
*B23B 31/107* (2006.01)

(52) U.S. Cl.
CPC ....... *B25B 23/0035* (2013.01); *B23B 31/1071* (2013.01); *Y10S 279/905* (2013.01); *Y10S 279/906* (2013.01); *Y10T 279/17* (2015.01); *Y10T 279/17145* (2015.01); *Y10T 279/17752* (2015.01)

(58) Field of Classification Search
CPC ............. B23B 31/22; B23B 31/1071; B25B 23/0035; Y10T 279/17145; Y10T 279/17752; Y10T 279/17188; Y10T 279/17196; Y10T 279/17743; Y10S 279/905; Y10S 279/906
USPC .................. 279/22, 29, 30, 74, 75, 905, 906
See application file for complete search history.

(56) References Cited

U.S. PATENT DOCUMENTS

| | | | | |
|---|---|---|---|---|
| 3,674,281 | A * | 7/1972 | Hedrick | 279/30 |
| 4,434,859 | A * | 3/1984 | Rumpp et al. | 173/48 |
| 4,491,444 | A * | 1/1985 | Rumpp et al. | 409/234 |
| 4,692,073 | A | 9/1987 | Martindell | |
| 4,858,939 | A * | 8/1989 | Riggs | 279/75 |
| 4,900,202 | A * | 2/1990 | Wienhold | 408/240 |
| 5,398,946 | A * | 3/1995 | Quiring | 279/30 |
| 6,126,370 | A * | 10/2000 | Wheeler et al. | 408/239 R |
| 6,457,916 | B2 * | 10/2002 | Wienhold | 408/240 |
| 7,121,774 | B2 * | 10/2006 | Hirt et al. | 408/240 |
| 7,287,449 | B2 * | 10/2007 | Abel et al. | 81/177.2 |
| 7,740,249 | B1 * | 6/2010 | Gao | 279/75 |

(Continued)

FOREIGN PATENT DOCUMENTS

| | | |
|---|---|---|
| CN | 101189101 A | 5/2008 |
| CN | 201613372 U | 10/2010 |

(Continued)

OTHER PUBLICATIONS

Chinese Office Action dated Mar. 26, 2015 (Three (3) pages).

*Primary Examiner* — Eric A Gates
(74) *Attorney, Agent, or Firm* — Crowell & Moring LLP

(57) ABSTRACT

An electric screwdriver is disclosed. The screwdriver has a spindle, a locking body, a radial stop, a strap, and a spring. The spindle defines a receiving area and an oblong hole which is open into the receiving area in a radial direction. The locking body is disposed in the oblong hole, where the locking body is protrudable into the receiving area. The radial stop is engageable with the locking body where, when the radial stop engages with the locking body, the locking body protrudes into the receiving area. A first end of the strap engages behind the locking body on a drive end. The spring is disposed between a second end of the strap and the radial stop.

16 Claims, 2 Drawing Sheets

(56) References Cited

U.S. PATENT DOCUMENTS

| | | | |
|---|---|---|---|
| 7,896,355 B2* | 3/2011 | Wienhold | 279/22 |
| 8,550,471 B2* | 10/2013 | Huang | 279/30 |
| 8,844,942 B1* | 9/2014 | Landowski et al. | 279/75 |
| 2001/0006015 A1* | 7/2001 | Wheeler et al. | 82/158 |
| 2006/0163824 A1 | 7/2006 | Sasaki et al. | |
| 2010/0207335 A1* | 8/2010 | Lin | 279/22 |

FOREIGN PATENT DOCUMENTS

| | | |
|---|---|---|
| DE | 20 2007 004 324 U1 | 8/2007 |
| EP | 1 506 843 A1 | 2/2005 |
| JP | 2000-254869 A | 9/2000 |
| WO | WO 2007/120893 A2 | 10/2007 |

* cited by examiner

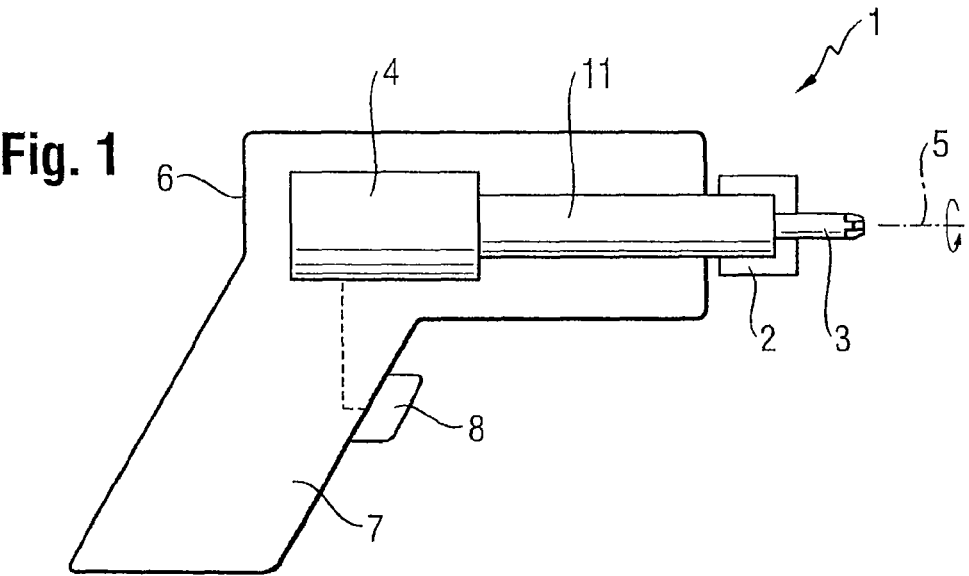

ELECTRIC SCREWDRIVER

This application claims the priority of German Patent Document No. DE 10 2011 076 454.2, filed May 25, 2011, the disclosure of which is expressly incorporated by reference herein.

SUMMARY OF THE INVENTION

The present invention relates to an electric screwdriver, in particular an electric screwdriver having a self-locking tool holder, which can be unlocked by operating it in the direction opposite the insertion direction of the tool.

The electric screwdriver according to the invention has a spindle, a locking body, an axially displaceable radial stop, a spring and a strap. The spindle has a cylindrical or prismatic receiving area oriented along a drive axis and open at the output end for receiving a screwdriver bit in the insertion direction and an oblong hole protruding in the radial direction into the receiving area. Resting in the oblong hole, the locking body protrudes into the receiving area and is movable between an end of the oblong hole on the output end and an end of the oblong hole on the drive end. The locking body is forced to engage in the receiving area when in contact with the radial stop. The radial stop is displaceable against the spring force of a spring in the insertion direction, thereby enabling a radial movement of the locking body out of engagement with the receiving area. The strap engages behind the locking body on the drive end and is displaceable in the insertion direction indirectly by the locking body against a spring force of the spring. In the radial direction, the locking body can leave the receiving area as it enters into a cavity.

The strap shifts the locking body into a basic position on or near the output end of the hole. The locking body cannot escape radially in this position because of the stop and blocks the tool through its engagement in the receiving space.

The tool is released by displacement of the stop in the direction opposite the insertion direction, so that the locking body is no longer restrained radially. On insertion of the tool, the strap together with the locking body can be displaced in the insertion direction against the action of the spring. Having arrived at the drive end of the oblong hole, the locking body can yield radially and can release the receiving area for the tool.

One embodiment provides that the spring is supported on the strap and is supported on a ring connected to the stop.

One embodiment provides that the strap is designed as a sleeve that surrounds the spindle, is movable along the working axis, and has an oblong hole such that the locking body engages in the oblong hole.

One embodiment provides that an operating sleeve which surrounds the spindle, the strap and the spring, has a ring protruding radially inward, with its inside surface forming the radial stop. The operating sleeve may be at a greater distance than the radial stop from the working axis in the radial direction.

The following description explains the invention on the basis of exemplary embodiments and figures.

BRIEF DESCRIPTION OF THE DRAWINGS

FIG. 1 shows an electric screwdriver;
FIG. 2 shows a tool holder with the tool locked.

DETAILED DESCRIPTION OF THE DRAWINGS

Figure 3:
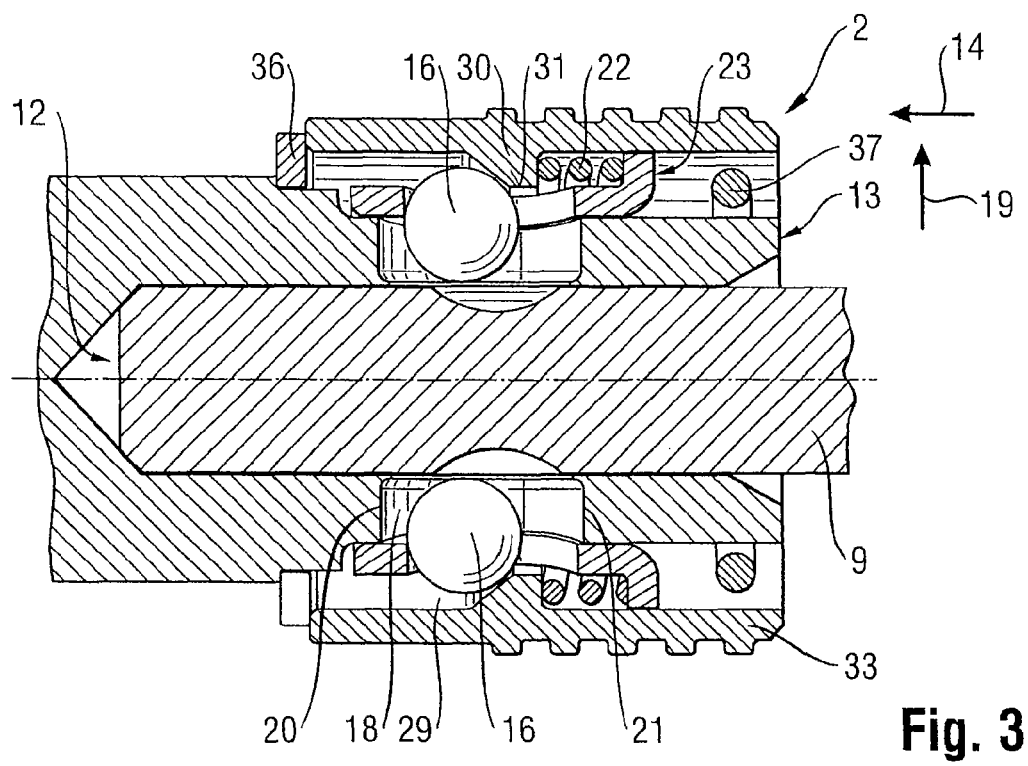
FIG. 3 shows the tool holder on insertion of the tool.

The same elements and those having the same function are indicated in the figures by the same reference numerals, unless otherwise indicated.

FIG. 1 shows schematically an electric screwdriver 1. The electric screwdriver 1 has a tool holder 2 for holding a screwdriver bit 3. The electric motor 4 is connected to the tool holder 2 via a drive train to drive the latter to rotate about a drive axis 5 during operation. A housing 6 of the electric screwdriver 1 is provided with a handle 7 for guiding the electric screwdriver 1 and with a system switch 8 for the user to start operation of the electric screwdriver 1.

Figure 4:
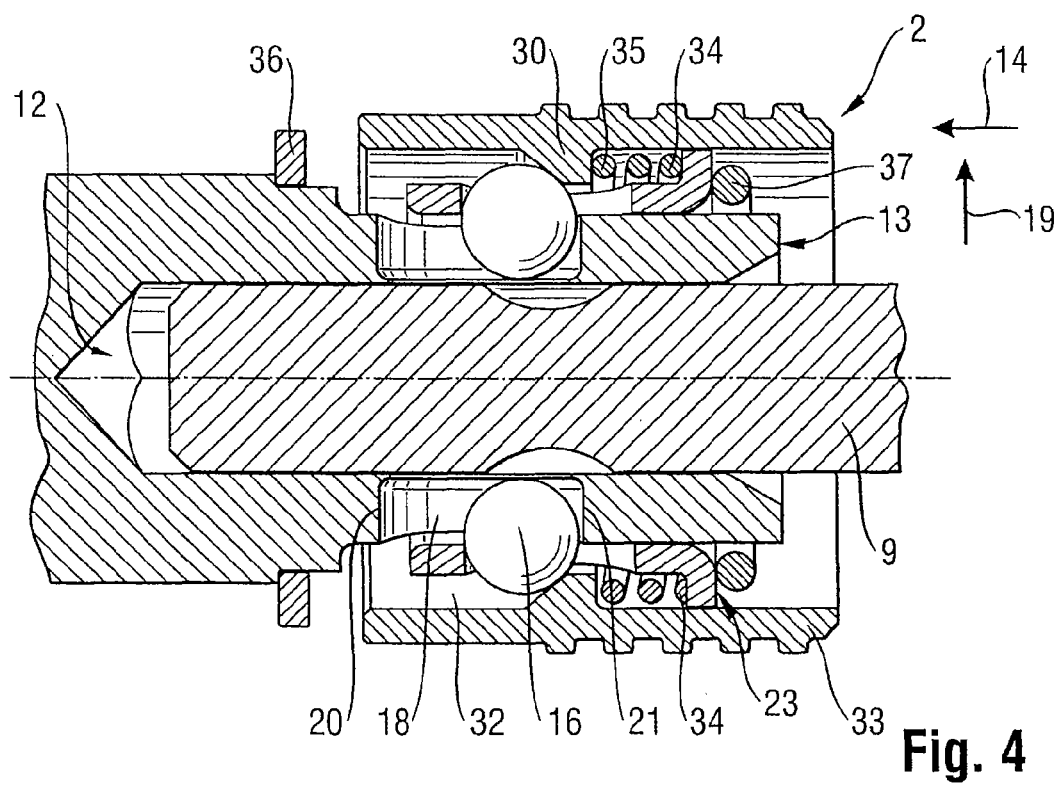
FIG. 4 shows the tool holder on removal of the tool.

FIG. 2, FIG. 3 and FIG. 4 show longitudinal sectional views of an exemplary tool holder 2 with the tool 3 inserted, on insertion of the tool and on removal of the tool, respectively. The tool holder 2 is designed in particular for conventional commercial screwdriver bits 3 having a prismatic shaft 9 with an annular groove 10.

A spindle 11 of the tool holder 2 is connected at the drive end to the motor 4, which can drive the spindle 11 to rotate about the working axis 5. On the output end, the spindle 11 is provided with a receiving area 12 for the shaft 9. The receiving area 12 is complementary to the shaft 9, for example, being designed with a prismatic shape and being open on the output end 13 of the spindle 11. A user can insert the tool 3 along the working axis 5 into the receiving area 12 in an insertion direction 14.

The tool holder 2 is provided with a self-locking and user-operated releasable lock 15 for locking the tool 3 in the receiving area 12. The tool 3 is locked by a locking body 16, which is engaged in the groove 10 and is formed by a ball, for example, as shown here.

A wall 17 of the hollow area of the spindle 11 is provided with an oblong hole 18. The oblong hole 18 passes through into the receiving area 12. The locking body 16 is inserted from the outside radially into the oblong hole 18 and engaged through the oblong hole 18 in the receiving area 12. A cross-sectional area of the oblong hole 18 may decrease in the radial direction 19 to the working axis 5. The locking body 16 is movable in the oblong hole 18 along the working axis 5 from a drive end 20 to an output end 21. One dimension of the oblong hole 18 along the working axis 5 is greater than the respective dimension of the locking body 16. The exemplary oblong hole 18 is longer than it is wide.

The locking body 16 may be raised outward in the radial direction 19 and thus brought out of engagement with the receiving area 12. The raising may be accomplished in particular by the shaft 9.

A spring 22 shifts the locking body 16 indirectly in the direction opposite the insertion direction 14 to the output end 21 of the oblong hole 18. The spring 22 acts on an axially movable strap 23, which engages behind the locking body 16. This strap 23 may have a sleeve 24, which is mounted on the spindle 11, as shown here as an example, and in which an oblong hole 25 is provided. The oblong hole 25 of the sleeve 24 may have the same shape as the oblong hole 18 of the spindle 11. The locking body 16 engages radially in the oblong hole 25. The exemplary sleeve 24 is provided with a collar 28, which is radially folded over radially toward the outside, on a drive end, with the spring 22 supported on the collar. The spring 22 is a helical spring, for example, which surrounds the sleeve 24.

On insertion of a tool 3, the locking body 16 is displaced by an end face of the tool 3 in the oblong hole 18 in the insertion direction 14 (see FIG. 3). In doing so, the strap 23 is entrained by the locking body 16 and deflected against the spring force of the spring 22. In the area of the drive end 20 of the oblong hole 18, the locking body 16 can always yield into a cavity 29 in the radial direction 19. The locking body 16 can yield radially toward the outside, at least to the extent that the locking body 16 is no longer engaged with the receiving area 12. The shaft 9 can be shifted past the locking body 16 until the groove 10 is aligned with the locking body 16 axially and the locking body 16 penetrates into the groove 10, so that it engages again in the receiving area 12. The strap 23 shifts the locking body 16 together with the tool 3 opposite the insertion direction 14 until the spring 22 is released or, as in the embodiment, until the locking body 16 is in contact with the output end 21 of the oblong hole 18 (FIG. 2).

A ring 30 is provided where an inside surface of the ring 30 forms a radial stop 31, which limits radial movement of the locking body 16 toward the outside radially. A radial distance of the stop 31 from the working axis 5 is such that the locking body 16 is engaged in the receiving area 12 when in contact with the stop 31. The locking body 16, which is held on the output end 21 by the strap 23, cannot yield radially because of the radial stop 31, so it remains engaged in the groove 10 and thus locks the tool 3 in the tool holder 2 (FIG. 2). From the locking position overlapping the oblong hole 18, the ring 30 can be displaced opposite the insertion direction 14. In an unlocked position, the ring 30 is without overlap with the oblong hole 18, in particular with the output end 21 of the oblong hole 18 (FIG. 4). The locking body 16 can then also yield in the radial direction 19 out of the receiving area 12 into a cavity 32 in the area of the output end 21. The ring 30 is connected, for example, to an operating sleeve 33, which the user can displace against the insertion direction 14, thereby unlocking the tool 3 and removing it opposite the insertion direction 14.

The ring 30 is acted upon by the force of the spring 22 in the insertion direction 14. The spring 22 is compressed with displacement of the ring 30, e.g., by the operating sleeve 33 opposite the insertion direction 14. As soon as the user releases the operating sleeve 33, the ring 30 with the radial stop 31 returns to the locking position. In a basic position, i.e., without intervention by the user, the locking body 16 is thus held in engagement by the strap 23 on the output end 21 and by the radial stop 31 in the receiving area 12 (see FIG. 2).

The spring 22, which is pressure loaded, for example, is connected at the output end 34 to strap 23, e.g., its collar 28, and is connected at the drive end 35 to the ring 30. The ring 30 is offset with respect to the collar 28 in the insertion direction 14. An axial stop 36 on the drive end limits the movement of the ring 30 in the insertion direction 14, i.e., holds the ring 30 in the locking position against the spring force. The operating sleeve 33, which is rigidly connected to the ring 30, may be in contact with the axial stop 36 on the drive end, for example. A movement of the strap 23 opposite the insertion direction 14 is limited by the locking body 16. In addition, the strap 23 may be in contact with an axial stop 37, e.g., a spring ring, in the basic position.

The invention is not limited to the exemplary embodiments shown here. Instead of the spherical locking body 16 other axially movable, e.g., roll-shaped, locking bodies may be used. Although an oblong hole 18 oriented parallel to the working axis 5 is preferred, as an alternative it may run in a spiral around the working axis 5. Instead of two locking bodies 16 and two oblong holes 18, only one or more than two may also be provided. The cylindrical design of the spindle 11, the strap 23, the spring 22, the ring 30 and the operating sleeve 33 is adapted in each case to the rotating movement of the spindle 11, but they may also be designed with a shape that does not have rotational symmetry.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An electric screwdriver, comprising:
    a spindle, wherein the spindle defines a receiving area which is open on an output end and is oriented along a working axis for receiving a screwdriver bit in an insertion direction and wherein the spindle defines a hole which extends oblong in a longitudinal direction of the spindle and which is open into the receiving area in a radial direction;
    a locking body disposed in the hole, wherein the locking body is movable in the hole in the longitudinal direction, and wherein the locking body is protrudable into the receiving area;
    a radial stop engageable with the locking body, wherein when the radial stop engages with the locking body the locking body protrudes into the receiving area;
    a strap, wherein a first end of the strap engages behind the locking body on a drive end, wherein the drive end is opposite from the open output end of the spindle, and wherein the strap is axially movable; and
    a spring, wherein the spring is disposed between a second end of the strap and the radial stop.

2. The electric screwdriver according to claim 1, wherein the radial stop is disposed on an inside surface of a ring, wherein the ring and the spindle define a cavity, and wherein the locking body is protrudable into the cavity.

3. The electric screwdriver according to claim 2, wherein a first end of the spring engages the second end of the strap and a second end of the spring engages the ring.

4. The electric screwdriver according to claim 1, wherein the strap is a sleeve which surrounds the spindle.

5. The electric screwdriver according to claim 1, further comprising an operating sleeve, wherein the operating sleeve surrounds the spindle, the strap, and the spring, wherein the operating sleeve includes a ring, and wherein the radial stop is disposed on an inside surface of the ring.

6. The electric screwdriver according to claim 5, wherein the operating sleeve is disposed at a distance from the working axis that is greater than a distance of the radial stop from the working axis.

7. The electric screwdriver according to claim 1, wherein the radial stop is disposed on an inside surface of a ring and further comprising a first axial stop and a second axial stop, wherein an axial movement of the ring in the insertion direction is limited by the first axial stop and wherein an axial movement of the strap in a direction opposite the insertion direction is limited by the second axial stop.

8. The electric screwdriver according to claim 1, wherein the strap defines an oblong hole and wherein the locking body is disposed in the oblong hole of the strap.

9. An electric screwdriver, comprising:
    a spindle, wherein the spindle defines a receiving area which is open on an output end and is oriented along a working axis for receiving a screwdriver bit in an insertion direction and wherein the spindle defines a hole which extends oblong in a longitudinal direction of the spindle and which is open into the receiving area in a radial direction;

a locking body disposed in the hole, wherein the locking body is movable in the hole in the longitudinal direction, and wherein the locking body is protrudable into the receiving area;

a radial stop engageable with the locking body, wherein when the radial stop engages with the locking body the locking body protrudes into the receiving area;

a strap, wherein a first end of the strap engages behind the locking body on a drive end, wherein the drive end is opposite from the open output end of the spindle; and a spring, wherein the spring is disposed between a second end of the strap and the radial stop and wherein the spring pushes the radial stop in the insertion direction.

10. The electric screwdriver according to claim 9, wherein the radial stop is disposed on an inside surface of a ring, wherein the ring and the spindle define a cavity, and wherein the locking body is protrudable into the cavity.

11. The electric screwdriver according to claim 10, wherein a first end of the spring engages the second end of the strap and a second end of the spring engages the ring.

12. The electric screwdriver according to claim 9, wherein the strap is a sleeve which surrounds the spindle.

13. The electric screwdriver according to claim 9, further comprising an operating sleeve, wherein the operating sleeve surrounds the spindle, the strap, and the spring, wherein the operating sleeve includes a ring, and wherein the radial stop is disposed on an inside surface of the ring.

14. The electric screwdriver according to claim 13, wherein the operating sleeve is disposed at a distance from the working axis that is greater than a distance of the radial stop from the working axis.

15. The electric screwdriver according to claim 9, wherein the radial stop is disposed on an inside surface of a ring and further comprising a first axial stop and a second axial stop, wherein an axial movement of the ring in the insertion direction is limited by the first axial stop and wherein an axial movement of the strap in a direction opposite the insertion direction is limited by the second axial stop.

16. The electric screwdriver according to claim 9, wherein the strap defines an oblong hole and wherein the locking body is disposed in the oblong hole of the strap.

* * * * *